(12) United States Patent  
Watson et al.

(10) Patent No.: US 6,624,980 B1
(45) Date of Patent: Sep. 23, 2003

(54) DISK DRIVE COMPRISING A SUPPORT MEMBER FOR SUPPORTING A FLEX CIRCUIT AND HAVING A RESTRAINING MEMBER FOR VERTICALLY RESTRAINING AN INERTIAL LATCH

(75) Inventors: Scott E. Watson, San Jose, CA (US); Serge Hauert, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 158 days.

(21) Appl. No.: 09/967,593

(22) Filed: Sep. 28, 2001

Related U.S. Application Data

(62) Division of application No. 09/753,280, filed on Dec. 27, 2000.

(51) Int. Cl.[7] .................................................. G11B 5/54
(52) U.S. Cl. .................................................... 360/256.4
(58) Field of Search ..................................... 360/256.4

(56) References Cited

U.S. PATENT DOCUMENTS 5,303,101 A    4/1994   Hatch et al.
5,636,090 A    6/1997   Boigenzahn et al.
6,185,074 B1 * 2/2001   Wang ....................... 360/256.4

* cited by examiner

Primary Examiner—A. J. Heinz
(74) Attorney, Agent, or Firm—Won Tae C. Kim, Esq.; Milad G. Shara, Esq.; Howard H. Sheerin, Esq.

(57) ABSTRACT

A disk drive is disclosed comprising a disk, an actuator arm, a head attached to the actuator arm, a voice coil motor, a parking latch for latching the actuator arm in a latched position in order to park the head during a non-operating mode, and a flex circuit having a first end and a second end, the first end coupled to the actuator arm. The disk drive further comprises an inertial latch for maintaining the actuator arm in the latched position when the disk drive is subjected to a physical shock. The inertial latch comprises a body having a protruding arm and defining a pivot axis. The inertial latch further comprises a support member coupled to the base, the support member comprising a connecting surface for connecting to the second end of the flex circuit, and a restraining member connected to the body of the inertial latch proximate the pivot axis, wherein the restraining member vertically restrains the inertial latch.

3 Claims, 6 Drawing Sheets

DISK DRIVE COMPRISING A SUPPORT MEMBER FOR SUPPORTING A FLEX CIRCUIT AND HAVING A RESTRAINING MEMBER FOR VERTICALLY RESTRAINING AN INERTIAL LATCH

This application is a divisional of U.S. patent application Ser. No. 09/753,280 filed Dec. 27, 2000, the disclosure of which is incorporated herein by reference.

CROSS REFERENCE TO RELATED APPLICATIONS AND PATENTS

This application is related to co-pending patent application Ser. No. 09/728,293 entitled "DISK DRIVE COMPRISING A PLASTIC MOLDED CRASH STOP WITH EMBEDDED MAGNET FOR LATCHING AN ACTUATOR ARM" filed on Nov. 30, 2000, the disclosure of which is incorporated herein by reference.

BACKGROUND OF THE INVENTION

1. Field of the Invention

The present invention relates to disk drives for computer systems. More particularly, the present invention relates to a disk drive comprising a support member for supporting a flex circuit and having a restraining member for vertically restraining an inertial latch.

2. Description of the Prior Art

A computer system usually includes one or more disk drives for economical, non-volatile data storage. Prior art disk drives typically comprise a base for housing a disk and a head attached to a distal end of an actuator arm. A spindle motor rotates the disk about its axis, and a voice coil motor (VCM) rotates the actuator arm about a pivot in order to position the head radially over the disk. A crash stop is provided which facilitates latching the head in a park position while the disk drive is powered down in order to protect the data recorded on the disk as well as prevent damage to the head. The head may be parked on a landing zone on the inner diameter (ID) of the disk, or alternatively, the head may be parked on a ramp located at the periphery of the disk (a.k.a., ramp loading/unloading).

The actuator arm comprises a tang attached to a base end and positioned between a first arm and second arm of the crash stop. The second arm presents a physical barrier to the tang so as to limit the stroke of the actuator arm, thereby preventing the head from exceeding a radial limit (e.g., the edge of the disk). The first arm comprises a parking latch with a magnet for latching the tang to the first arm, thereby safely parking the head (e.g., on the inner diameter of the disk). In order to prevent damaging the head as well as the surface of the disk, the force from the magnetic parking latch helps prevent the actuator arm from unlatching when the disk drive is subjected to an external, physical shock. However, the actuator arm will unlatch if the physical shock is of sufficient magnitude, particularly if the physical shock causes the disk drive to rotate such that the magnetic parking latch is jerked away from the tang.

In prior art disk drives an inertial latch has been employed which prevents the actuator arm from unlatching when the disk drive is subjected to large rotational shocks. The inertial latch comprises a protruding arm which rotates about a pivot and "catches" the actuator arm to prevent it from unlatching during a rotational shock. The inertial latch also comprises a biasing mechanism for applying a biasing force to the arm in order to reposition it when the rotational shock subsides.

Prior art inertial latches employ a torsion spring comprised of a wound coil which provides resistance to torque, thereby providing the biasing force against the rotation of the arm. However, torsion springs are complicated and expensive to manufacture, and their spring characteristics (e.g., spring constant) are sensitive to dimensional tolerances. Further, installing the torsion spring is difficult and requires a high degree of accuracy which further increases the cost and manufacturing complexity of the inertial latch.

Another problem with prior art torsion springs is the linear relationship between the displacement of the spring versus the load as illustrated in FIG. 6A. Because the relationship is substantially linear, it is difficult to design the torsion spring so that the inertial latch operates properly when the disk drive is subjected to small rotational shocks. Thus, the magnetic parking latch within the crash stop is typically designed to withstand larger rotational shocks than would be necessary if the spring load curve of the inertial latch were more constant. Designing the magnetic parking latch with a higher latching force to compensate for the insensitivity of a torsion spring further increases the cost of the disk drive.

There is, therefore, a need for a disk drive employing an improved inertial latch that is more cost-effective to manufacture and install, and more sensitive to small physical shocks.

SUMMARY OF THE INVENTION

The present invention may be regarded as a disk drive comprising a disk, an actuator arm, a head attached to a distal end of the actuator arm, a voice coil motor for rotating the actuator arm to position the head radially over the disk, and a flex circuit having a first end and a second end, the first end coupled to the actuator arm. The disk drive further comprises a parking latch for latching the actuator arm in a latched position in order to park the head during a non-operating mode, and an inertial latch for maintaining the actuator arm in the latched position when the disk drive is subjected to a physical shock. The inertial latch comprises a body having a protruding arm and defining a pivot axis. The inertial latch further comprises a support member coupled to the base, the support member comprising a connecting surface for connecting to the second end of the flex circuit, and a restraining member connected to the body of the inertial latch proximate the pivot axis, wherein the restraining member vertically restrains the inertial latch.

In one embodiment, the disk drive further comprises a post comprising a curved side surface and a top surface. The inertial latch further comprises a cylindrical cavity, an interior pivot surface defined by an interior surface of the cylindrical cavity, and an exterior pivot surface defined by an exterior surface of the cylindrical cavity opposite the interior pivot surface. The post is disposed axially through the cylindrical cavity such that the top surface of the post contacts the interior pivot surface of the cylindrical cavity, and the restraining member contacts the exterior pivot surface of the inertial latch.

DESCRIPTION OF THE PREFERRED EMBODIMENTS

Figure 1:
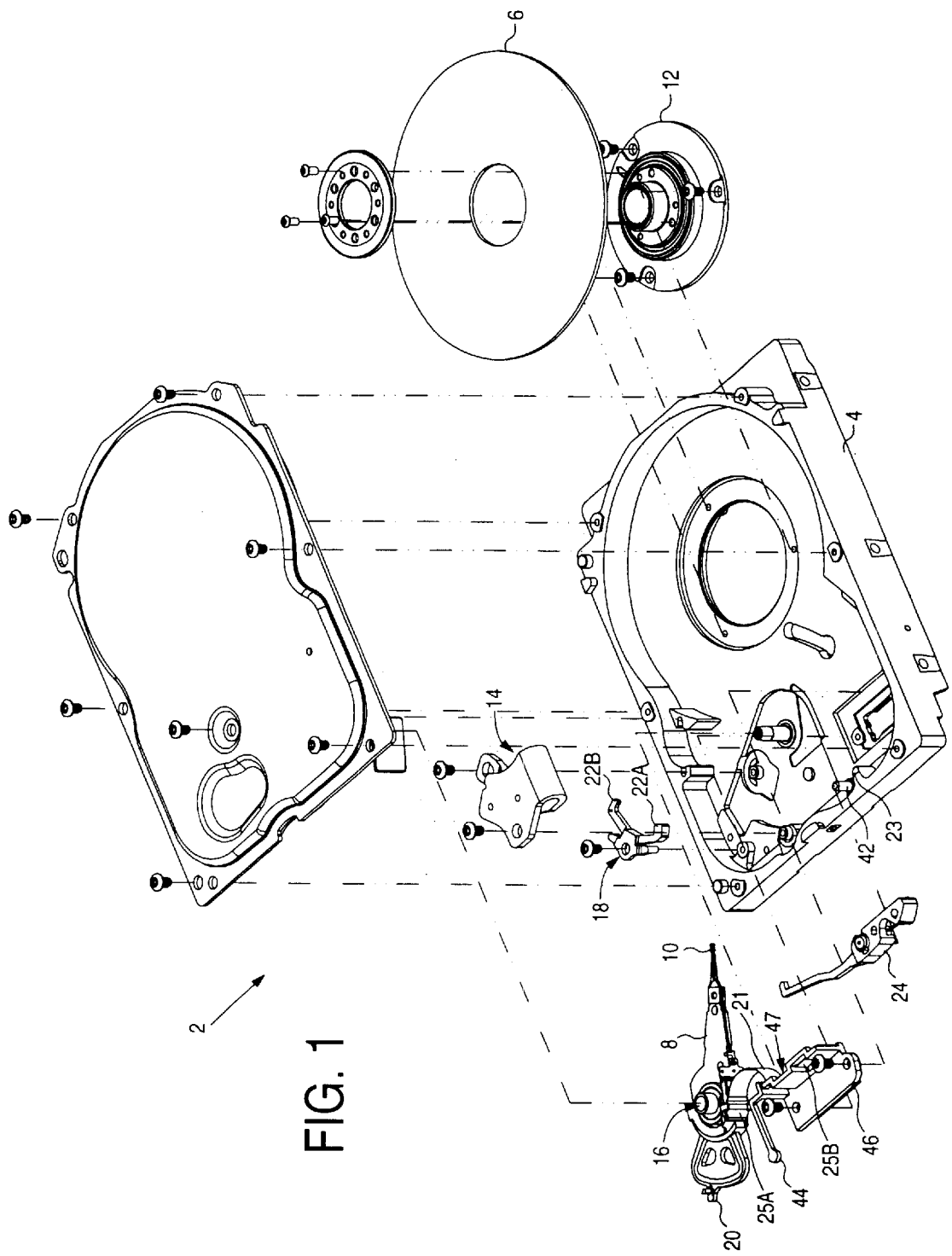
FIG. 1 is an exploded view of a disk drive comprising a head attached to a distal end of an actuator arm, a crash stop for latching the actuator arm in a parked position, and an inertial latch for latching the actuator arm in the parked position to protect against physical shocks to the disk drive according to an embodiment of the invention.
Figure 2:
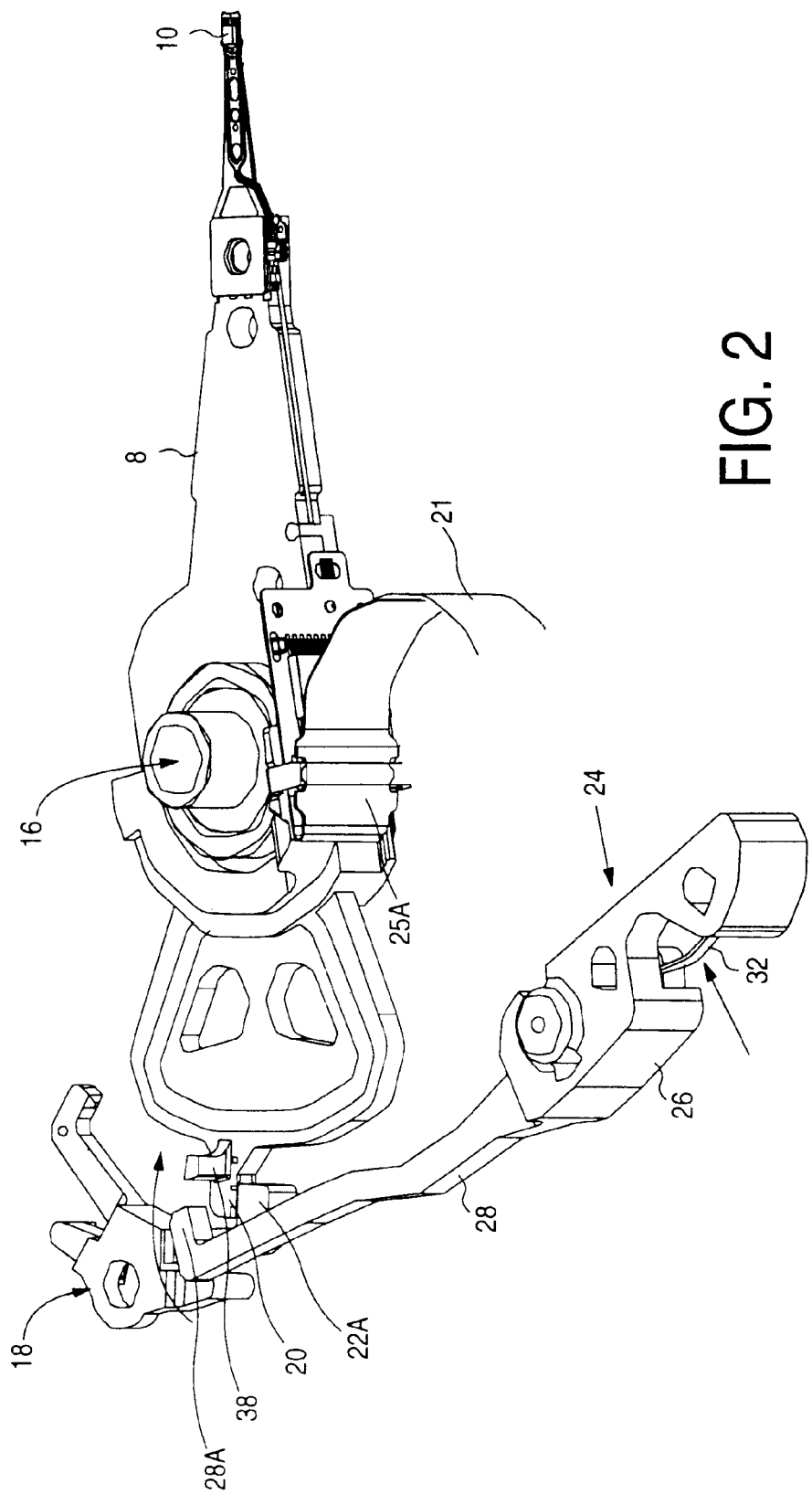
FIG. 2 shows details of the inertial latch as comprising a protruding arm for engaging the actuator arm during the physical shock, and a strip-spring for providing a biasing force to disengage the protruding arm from the actuator arm when the shock subsides.

FIG. 1 shows a disk drive 2 according to an embodiment of the present invention comprising a disk 6, an actuator arm 8, a head 10 attached to a distal end of the actuator arm 8, a voice coil motor 14 for rotating the actuator arm 8 about a pivot 16 to position the head 10 radially over the disk 6, and a flex circuit 21 having a first end 25A and a second end 25B, the first end 25A coupled to the actuator arm 8. The disk drive 2 further comprises a parking latch for latching the actuator arm 8 in a latched position in order to park the head 10 during a non-operating mode, and an inertial latch 24 for maintaining the actuator arm 8 in the latched position when the disk drive 2 is subjected to a physical shock. As illustrated in FIG. 2, the inertial latch 24 comprises a body 26 having a protruding arm 28 and defines a pivot axis 31 (FIG. 4C). The disk drive 2 of FIG. 1 further comprises a support member 46 having a connecting surface 47 connected to the second end 25B of the flex circuit, and a restraining member 44 connected to the body of the inertial latch 24 proximate the pivot axis 31, wherein the restraining member 44 vertically restrains the inertial latch 24.

In the embodiment of FIG. 2, the parking latch comprises a magnet embedded within the first arm 24A of the crash stop 18. The tang 20 at the base end of the actuator arm 8 comprises a metal plate attracted by the magnetic flux generated by the magnet so as to latch the tang 20 to the first arm 22A of the crash stop 18, thereby parking the head 10. Further details concerning the crash stop 18 and parking latch are disclosed in the above-referenced patent application entitled "DISK DRIVE COMPRISING A PLASTIC MOLDED CRASH STOP WITH EMBEDDED MAGNET FOR LATCHING AN ACTUATOR ARM".

In the embodiment of FIG. 2, the actuator arm 8 further comprises a tab 38 attached to (or formed integral with) the tang 20. The protruding arm 28 of the inertial latch 24 comprises a hook member 28A at its distal end. When the body 26 of the inertial latch 24 rotates due to a physical shock, the hook member 28A of the protruding arm 28 engages the tab 38 so as to prevent the tang 20 from unlatching. As the body 26 rotates, a strip-spring 32 presses against a post 23 creating a load on the strip-spring 32 in the direction of the arrow shown in FIG. 2. This load results in a biasing force which rotates the body 26 about the pivot surface 30 to disengage the hook member 28A from the tab 38 when the physical shock subsides.

Figure 3A:
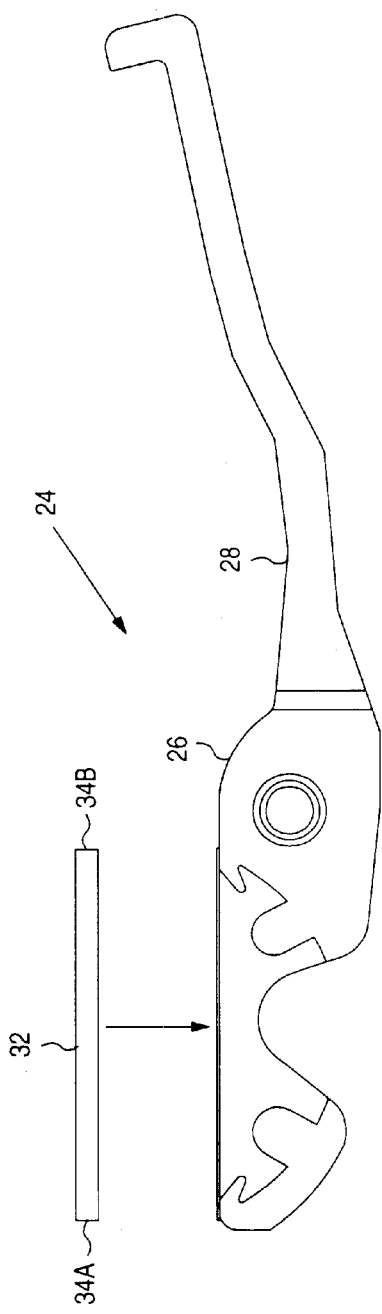
FIGS. 3A and 3B illustrate how the inertial latch is manufactured according to an embodiment of the present invention by pushing the strip-spring into first and second receptors such that the strip-spring comprises an initial arc.
Figure 3B:
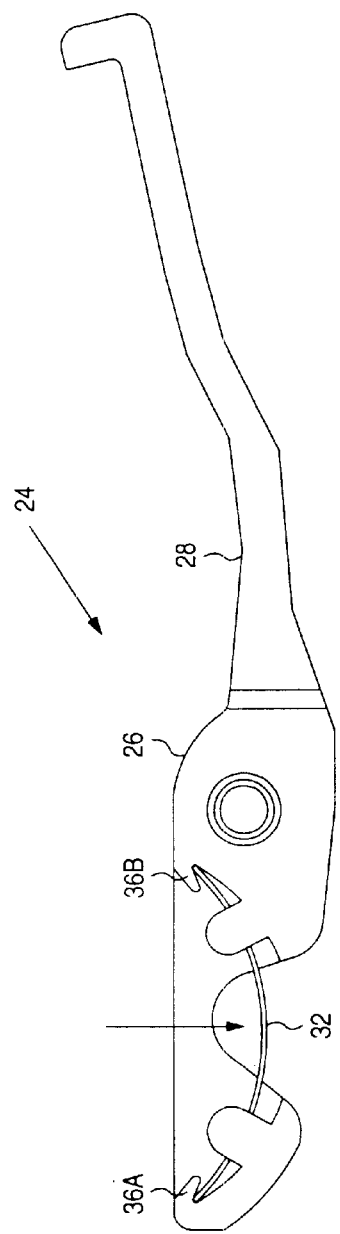

The strip-spring 32 comprises any suitable shape, such as a substantially rectangular or cylindrical shape, and comprises any suitable material. In one embodiment, the strip spring 32 comprises a plastic film such as mylar. FIG. 3A and 3B illustrate a method of manufacturing the inertial latch 24 according to an embodiment of the present invention. A substantially rectangular strip-spring 32 comprising a first end 34A and a second end 34B is placed over an opening to an arc-shaped cavity of the body 26 of the inertial latch 24 as illustrated in FIG. 3A. The strip-spring 32 is then pushed into the arc-shaped cavity until the first and second ends 34A and 34B snap into the first and second receptors 36A and 36B as illustrated in FIG. 3B. In the embodiment of FIG. 3B, the first and second receptors 36A and 36B comprise a hook-latch for latching the first and second ends 34A and 34B of the strip-spring 32. The initial arc displacement of the strip spring 32 generates a restraining force for restraining the strip-spring 32 within the inertial latch 24. This reduces the manufacturing time and expense as compared to the difficulty of accurately installing a torsion spring into a prior art inertial latch.

Figure 4A:
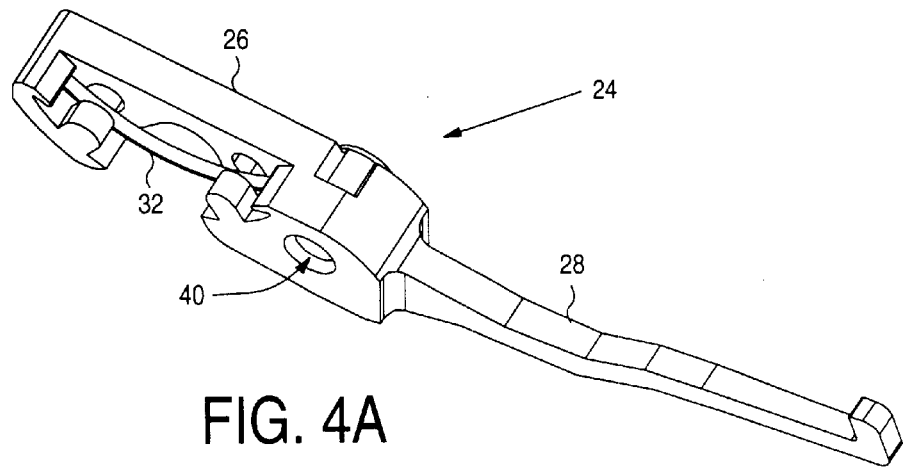
FIGS. 4A and 4B show perspective views of the inertial latch.
Figure 4B:
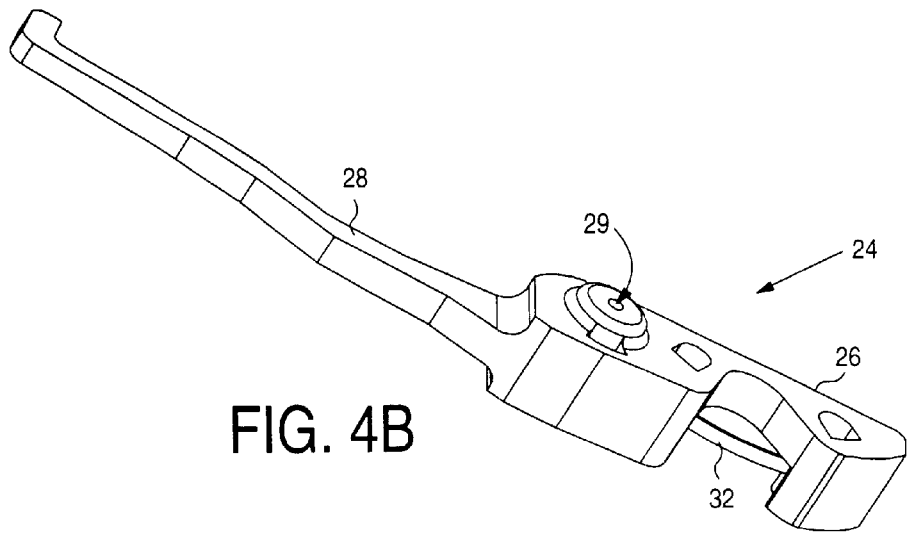
Figure 4C:
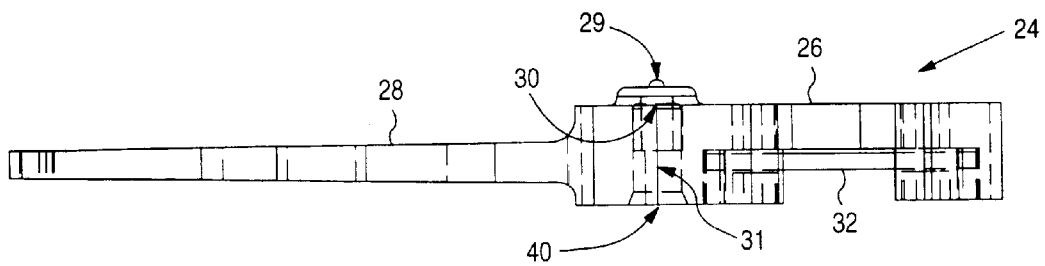
FIG. 4C shows a side view of the inertial latch.

FIG. 4A shows a bottom/front perspective view of the inertial latch 24, FIG. 4B shows a top/rear perspective view of the inertial latch 24 and FIG. 4C shows a side/rear view of the inertial latch 24. As shown in FIG. 4A, the inertial latch 24 comprises a round opening 40 to a cylindrical cavity formed within the body 26 of the inertial latch 24. The inertial latch 24 is installed over a post 42 within the disk drive 2 (FIG. 1) such that the post 42 is disposed axially through the cylindrical cavity until a top surface of the post 42 abuts an interior of pivot surface 30 (FIG. 4C) of the body 26. The pivot surface 30 of the body 26 thus rotates about the top surface of the post 42.

Figure 5:
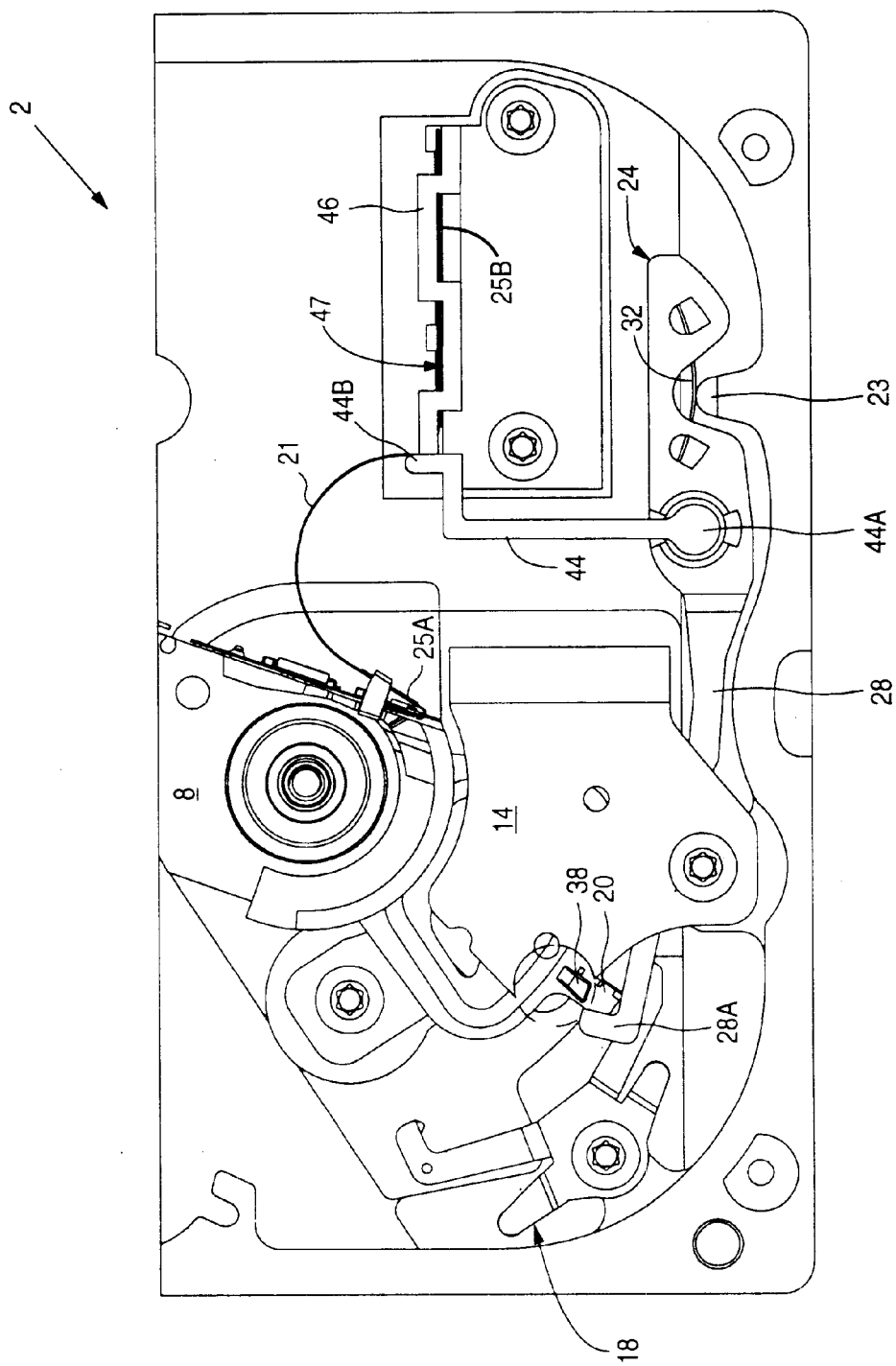
FIG. 5 shows the inertial latch installed into the disk drive of FIG. 1.

FIG. 5 shows a top view of the disk drive 2 of FIG. 1, including the orientation of the inertial latch 24 with respect to other surrounding components. The inertial latch 24 is shown in its normal, unlatched position. When the disk drive 2 is subject to a physical shock, the inertial latch 24 rotates in a clockwise direction such that the protruding arm 28 engages the actuator arm 8 (e.g., the hook member 28A engages the tab 38) to prevent the actuator arm 8 from unlatching. As the inertial latch 24 rotates, the post 23 presses against the strip spring 32 creating the biasing force which rotates the inertial latch 24 back into its normal position when the physical shock subsides. In the embodiment shown in FIG. 5, a restraining member 44 having a first end 44A attached to an exterior pivot surface 29 located on the top of the inertial latch 24 opposite the interior pivot surface 30 (FIG. 4C), and a second end 44B attached to the base 4 of the disk drive (through support member 46), stabilizes the inertial latch 24 as it rotates about the pivot surface 30 (FIG. 4C).

Figure 6A:
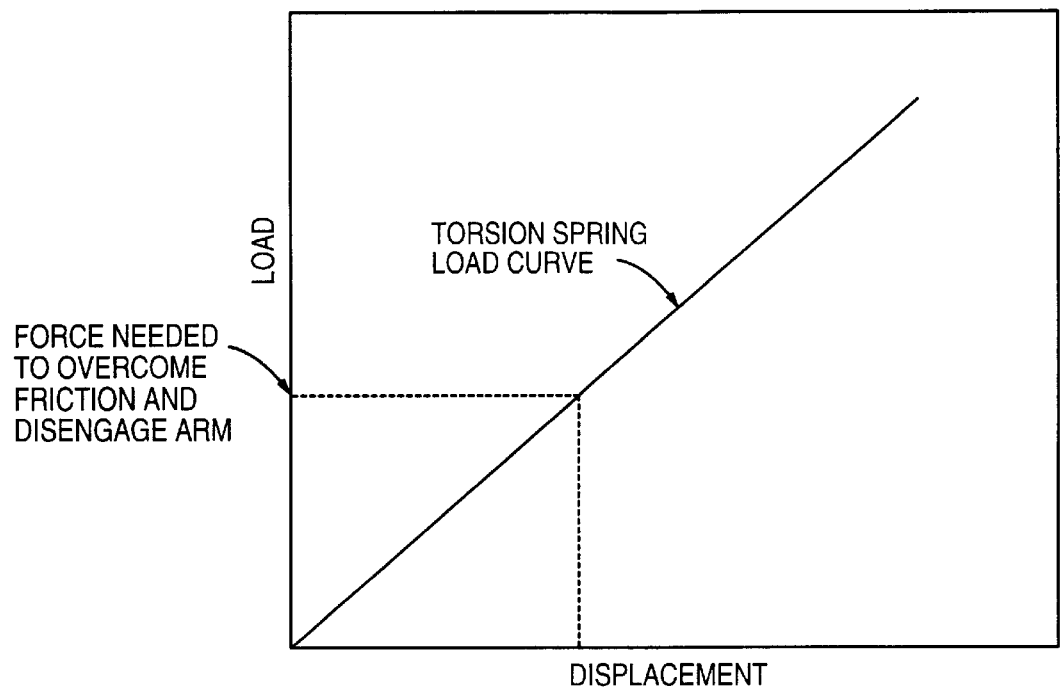
FIG. 6A is a load curve for a prior art torsion spring illustrating the substantially linear relationship between the load on the torsion spring versus the displacement of the torsion spring.
Figure 6B:
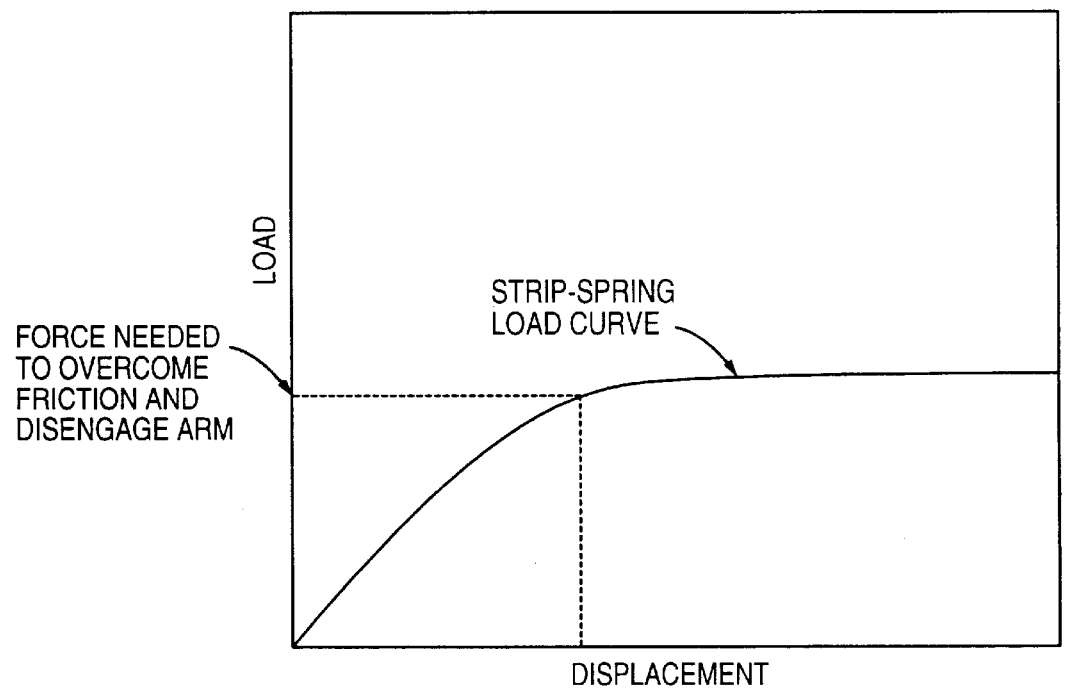
FIG. 6B is a load curve for a strip-spring according to an embodiment of the present invention illustrating the substantially constant relationship between the load on the strip-spring versus the displacement of the strip-spring beyond a certain load.

FIG. 6B is a load curve for a strip-spring according to an embodiment of the present invention illustrating the substantially constant relationship between the load on the strip-spring versus the displacement of the strip-spring beyond a certain load. Because the load curve is substantially constant beyond a certain load, the inertial latch is more sensitive to smaller physical shocks. In one embodiment, the strip-spring dimensions (e.g., length, width and thickness) are selected to achieve a desired spring characteristic. In one embodiment, the dimensions are selected such that the load curve transitions to a substantially constant relationship at a load slightly greater than the force needed to overcome the friction and rotate the inertial latch 24 back into its normal position after a physical shock (see FIG. 6B). In this manner, the inertial latch 24 will properly rotate and engage the actuator arm 8 in the presence of small physical shocks which are slightly greater than the friction force of the inertial latch 24.

We claim:

1. A disk drive comprising:
   (a) a disk;
   (b) an actuator arm;
   (c) a head attached to a distal end of the actuator arm;
   (d) a voice coil motor for rotating the actuator arm to position the head radially over the disk;
   (e) a flex circuit having a first end and a second end, the first end coupled to the actuator arm;
   (f) a parking latch for latching the actuator arm in a latched position in order to park the head during a non-operating mode;
   (g) an inertial latch for maintaining the actuator arm in the latched position when the disk drive is subjected to a physical shock, the inertial latch comprising a body having a protruding arm and defining a pivot axis; and
   (h) a support member coupled to the base, the support member comprising: a connecting surface connected to the second end of the flex circuit; and
      a restraining member connected to the body of the inertial latch proximate the pivot axis, wherein the restraining member vertically restrains the inertial latch.

2. The disk drive as recited in claim 1, wherein:
   (a) the disk drive further comprises a post comprising a curved side surface and a top surface;
   (b) the inertial latch further comprises:
      a cylindrical cavity;
      an interior pivot surface defined by an interior surface of the cylindrical cavity; and
      an exterior pivot surface defined by an exterior surface of the cylindrical cavity opposite the interior pivot surface,
   (c) the post is disposed axially through the cylindrical cavity such that the top surface of the post contacts the interior pivot surface of the cylindrical cavity; and
   (d) the restraining member contacts the exterior pivot surface of the inertial latch.

3. A disk drive comprising:
   (a) a disk;
   (b) an actuator arm;
   (c) a head attached to a distal end of the actuator arm;
   (d) a voice coil motor for rotating the actuator arm to position the head radially over the disk;
   (e) a parking latch for latching the actuator arm in a latched position in order to park the head during a non-operating mode;
   (f) a post comprising a curved side surface and a top surface;
   (g) an inertial latch for maintaining the actuator arm in the latched position when the disk drive is subjected to a physical shock, the inertial latch comprising:
      a body having a protruding arm;
      a cylindrical cavity;
      an interior pivot surface defined by an interior surface of the cylindrical cavity; and
      an exterior pivot surface defined by an exterior surface of the cylindrical cavity opposite the interior pivot surface,
      wherein the post is disposed axially through the cylindrical cavity such that the top surface of the post contacts the interior pivot surface of the cylindrical cavity; and
   (h) a restraining member connected to the exterior pivot surface of the inertial latch, wherein the restraining member vertically restrains the inertial latch.

* * * * *